United States Patent [19]

Sterzel

[11] Patent Number: 5,073,320

[45] Date of Patent: Dec. 17, 1991

[54] PREPARATION OF THERMOPLASTICS CONTAINING CERAMIC POWDERS AS FILLERS

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 580,860

[22] Filed: Sep. 11, 1990

[30] Foreign Application Priority Data

Sep. 22, 1989 [DE] Fed. Rep. of Germany ....... 3931652

[51] Int. Cl.$^5$ ................. B29C 47/00; B29C 47/76
[52] U.S. Cl. ................................. 264/101; 264/211; 264/211.23
[58] Field of Search ............... 264/63, 101, 102, 211, 264/211.21, 211.23, 349, 211.11; 523/340, 348; 528/480, 501, 502

[56] References Cited

U.S. PATENT DOCUMENTS 4,965,039 10/1990 Schuetz ..................... 264/63 X

FOREIGN PATENT DOCUMENTS 3245184 4/1986 Fed. Rep. of Germany .

*Primary Examiner*—Leo B. Tentoni
*Attorney, Agent, or Firm*—Keil & Weinkauf

[57] ABSTRACT

Thermoplastic materials containing ceramic powders as fillers are prepared by introducing the thermoplastics into a mixing zone comprising a plurality of zones. The thermoplastics are melted in a first zone. In the subsequent second zone, the molten plastic is mixed with a suspension of a ceramic powder in an organic solvent, and the solvent is removed by distillation under reduced pressure in the third zone. In the fourth zone, the melt containing the ceramic powder is compressed and extruded. The process is suitable for the preparation of thermoplastic materials having a degree of filling of from 40 to 80% by volume of ceramic powders.

5 Claims, No Drawings

PREPARATION OF THERMOPLASTICS CONTAINING CERAMIC POWDERS AS FILLERS

BACKGROUND OF THE INVENTION

Thermoplastics contain mineral fillers, eg. wollastonite, talc, chalk or quartz sand, in order to increase the rigidity and strength and to reduce the thermal elongation, shrinkage and warpage.

So long as the content of mineral fillers does not exceed a proportion of about 30 % by volume, incorporation into the molten plastics is not generally associated with any particular problems. At higher degrees of filling, however, the flow behavior of the materials becomes so poor that they become virtually impossible to process, for example by injection molding.

Recently, a process for the production of ceramic moldings in which a thermoplastic is mixed with ceramic powders, heated in a suitable machine, shaped and cooled, has become increasingly important. The plastic is subsequently removed, for example by heating, before the ceramic materials are finally sintered. In this process, thermoplastics which contain 50 % by volume or more of ceramic material are required. Only at this and higher degrees of filling is it possible to obtain, from the moldings after removal of the thermoplastic binder, reasonably solid preforms which survive the further process steps, in particular the sintering, in an undamaged condition.

The higher the degree of filling, the lower the shrinkage on sintering and the better the moldings retain their dimensions. For this reason, ceramic parts of the highest possible degree of filling by volume of the ceramic powder are desired for injection molding or extrusion. This also applies in essence to the production of ceramic fibers, one method for which is to mix ceramic powders with a polymer, to remove this mixture by dissolution, pyrolysis or hydrolysis and to sinter the "green" fiber. The highest possible degree of filling by volume and good spinning properties must be ensured here.

However, the preparation of such materials containing $\geq 50$ % by volume of ceramic powders is associated with considerable problems if it is desired to mix these ceramic powders with the melt of a thermoplastic. A long mixing time is necessary to homogenize the material, while the powder is deagglomerated and individual powder particles are wetted by the polymer. It has become apparent that the deagglomeration of the powder is incomplete and it is hardly possible to achieve degrees of filling above 50 % by volume. Although the dispersion time is reduced somewhat by treating the powders with dispersion aids, such as polyethylene oxides, montan ester waxes, long-chain carboxylic acids or long-chain hydroxycarboxylic acids, the deagglomeration is not, however, promoted to any significant extent. Due to the long mixing times under steep shear gradients, the mixer materials, principally iron, are subjected to considerable erosion and the batch is thus contaminated.

DESCRIPTION OF PREFERRED EMBODIMENTS

German Patent 32 45 184 describes a process for the preparation of injection-moldable ceramic materials in which the starting materials are mixtures of ceramic powders in an organic solvent with waxes, oils and/or plastics. A dissolved or gaseous reactant which initiates solution polymerization in the mixture is added. The process has the disadvantage of producing plastics having molecular weights which are difficult to control.

It is an object of the present invention to provide a process for the preparation of thermoplastic materials containing ceramic powders as fillers, by mixing the ceramic powders with the molten thermoplastics and in which the disadvantages of the prior art processes are avoided and using which thermoplastic materials having a high degree of filling by ceramic powders are successfully prepared.

We have found that, surprisingly, this object is achieved by, in a mixing zone comprising a plurality of successive zones, melting the thermoplastics in a first zone, adding a suspension of the ceramic powder in an organic solvent to the molten plastic in the second zone and mixing the components, removing the solvent under reduced pressure in the third zone, and compressing and extruding the melt containing the ceramic powder in the fourth zone.

SUMMARY OF THE INVENTION

The process according to the invention is carried out in commercially available extruders whose feed, kneading and mixing elements have a modular design, in accordance with requirements. Preference is given to twin-screw extruders, since they are self-cleaning and have a narrow residence-time spectrum. The thermoplastic granules are fed to the frontmost part of the extruder. This is followed by the melting zone, after which the powder suspension is pumped into the molten material. This avoids the powder suspension coming into contact with the thermoplastic before it has been plasticized and avoids increased metal erosion occurring at this point due to the high shear forces.

After the melt and suspension streams have combined, they flow into a mixing zone in which the suspension and melt are mixed homogeneously. The solvent is then removed by distillation under reduced pressure via one or more vents. This is followed by a compression zone, in which the material substantially freed from solvent is compressed before being extruded through dies. The extrudates are cooled and granulated.

Examples of suitable thermoplastics are polyacrylates, ethylcellulose, ABS, hydroxypropylcellulose, high and low density polyethylene, oxidized polyethylene, cellulose acetate, polyamides, ethylene-acrylic acid copolymers, cellulose acetate butyrate, polystyrenes, polybutylene, polysulfones, polyethylene glycols and polyethylene oxides. Polyoxymethylene and copolymers thereof are particularly suitable.

According to the invention, the molten plastic is mixed in the second zone with a suspension of a ceramic powder in an organic solvent. Examples of suitable ceramic powders are the oxides, nitrides and carbides of third and/or fourth main or sub-group elements, eg. preferably silicon carbide, silicon nitride, aluminum oxide, zirconium dioxide, boron nitride BN, boron carbide $B_4C$ or titanium carbide. The ceramic powders expediently have a grain size $\leq 5$ $\mu m$, preferably from 0.2 to 2 $\mu m$. The expression ceramic powders is also intended to cover fibrous substances having lengths of from 0.01 to 1 mm, for example based on aluminum oxide, silicon carbide or silicon nitride. These ceramic powders are suspended in an organic solvent capable of dissolving the plastic employed. Examples are decalin or xylene for polyethylene and polyethylene/wax mixtures, diglycol dimethyl ether for polystyrene and copolymers with acrylonitrile, or benzyl alcohol for polyethylene terephthalate, lybutylene terephthalate, nylon 6, nylon 6,6, polyoxymethylene or polysulfones.

If necessary, the ceramic powders are deagglomerated under the action of shear forces, for example in ball mills, if necessary in the presence of dispersion aids, during preparation of the suspensions. The proportion by volume of the powders in the suspending agent is determined by optimizing the conditions: on the one hand, it must be as large as possible in order to as far as possible avoid having to remove solvent in the extruder by distillation, and on the other hand the viscosity of the suspension must not impede deagglomeration. In addition, it must still be possible to pump the suspension. It has been shown that contents of from 10 to 35% by volume, preferably from 25 to 33% by volume, give optimum results. If it is necessary to carry out deagglomeration at contents of less than 25% by volume, the suspension can be concentrated by partial evaporation of the solvent. It is also possible to carry out the deagglomeration in a low-boiling suspending agent or suspending agent mixture at low contents by volume and then to add a higher-boiling suspending agent which is miscible with the low-boiling suspending agent and to remove the low-boiling suspending agent(s) by distillation.

This procedure is particularly suitable if the actual suspending agent has an increased density and/or viscosity and thus makes deagglomeration by grinding more difficult.

The suspensions are pumped into a degassing extruder and mixed with the melt of the thermoplastic, and, in the same extruder, the solvent is removed from the mixture by distillation under reduced pressure and the substantially solvent-free material is extruded through dies.

Surprisingly, the reagglomeration of the powders does not occur in this procedure. The degree of deagglomeration in the suspension step is fully retained.

The residence time in the extruder is only from 1 to 5 minutes, which means that the thermoplastic is hardly damaged at all and virtually no molecular weight degradation takes place. In addition, material erosion is extremely low.

Using the process according to the invention, pore-free thermoplastic materials having a high degree of filling by ceramic powders of from 40 to 80% by volume are successfully prepared. The ceramic powders are distributed homogeneously in the thermoplastic material.

EXAMPLE 1 (COMPARATIVE EXAMPLE)

Using a twin-screw extruder, 5.0 kg/h of poly styrene are melted at 250° C. and extruded through dies. The polystyrene employed is characterized by a melt flow index of 24 g/10 min, measured in accordance with DIN 53 735 at 200° C. and a load of 21.6 kg. At the same point where the polystyrene granules are introduced, silicon nitride powder (grain size from 0.5 to 1.5 μm) having an iron content of 0.011 % by weight which has been dried at 400° C. is introduced in increasing amounts. 2% by weight of stearic acid had been applied as dispersifier to the silicon nitride powder. At a metering rate of 10.5 kg/h, which corresponds to a proportion of 40% by volume, the torque at the extruder shaft has become so large that the metering rate cannot be increased any further. In a second run, the granules containing 40% by volume of silicon nitride are employed as the starting material and mixed with further silicon nitride. The experiment must be terminated at 47% by volume of silicon nitride since the maximum torque has been reached. The iron content is on average 0.013%. by weight, individual granules containing eroded iron particles having a size of from 50 to 100 μm.

EXAMPLE 2

A deagglomerated suspension of silicon nitride powder in diglycol dimethyl ether is prepared using a stirred ball mill. The proportion of silicon nitride powder (grain size from 0.5 to 1.5 μm) having an iron content of from 0.11% by weight is 30% by volume, and the proportion of stearic acid, based on the silicon nitride powder, is 2%. This suspension is mixed at 250° C. at a flow rate of 24.3 l/h in the second zone of a twin screw degassing extruder with a polystyrene melt, produced in the first zone, at a flow rate of 4.0 kg/h. The polystyrene employed is characterized by a melt flow index of 24 g/min, measured in accordance with DIN 53 735 at 200° C. and a load of 21.6 kg. After the mixing zone, 17 l/h of diglycol dimethyl ether are removed by distillation at about 50 mbar in the subsequent zone, to give granules containing 64% by volume of silicon nitride powder. The iron content is 0.009% by weight, and microscopically detectable iron particles produced by erosion are found.

EXAMPLE 3 (COMPARATIVE EXAMPLE)

Using a twin-screw extruder, 6 kg/h of polyoxy methylene are melted at 180° C. and extruded through dies. The polyoxymethylene used is characterized by a melt flow index of 13 g/10 min, measured in accordance with DIN 53 735 at 190° C. and a load of 2.16 kg. At the same point where the polyoxymethylene granules are introduced, silicon nitride powder dried at 400° C. and containing 0.011% by weight of iron (type LC10) is introduced in increasing amounts. 3% by weight of polyethylene oxide of molecular weight 400 had been applied as dispersifier to the silicon nitride powder.

The maximum torque of the extruder is reached at a flow rate of 9.6 kg/h, corresponding to a proportion of 42% by volume of silicon nitride powder. In a second run, the granules prepared in this way are employed as the starting material and mixed with further silicon nitride. The experiment must be terminated at 50% by volume of silicon nitride since the maximum torque has been reached. The iron content is 0.014% by weight on average. Individual granules contain iron particles up to a size of 80 μm produced by erosion.

EXAMPLE 4

A deagglomerated suspension of silicon nitride powder (grain size from 0.5 to 1.5 μm) in benzyl alcohol is prepared using a stirred ball mill. The proportion of silicon nitride powder is 33 % by volume, and the proportion of polyethylene oxide of molecular weight 400, based on the silicon nitride powder, is 3% by weight. This suspension is mixed at 185° C. at a flow rate of 20.3 l/h in a twin-screw degassing extruder described in Example 2 with a polyoxymethylene melt at a flow rate of 5 kg/h. The polyoxymethylene used is characterized by a melt flow index of 13 g/10 min, measured in accordance with DIN 53 735 at 190° C. and a load of 2.16 kg. After the mixing zone, 13.6 l/h of benzyl alcohol are removed by distillation at about 30 mbar. The granules obtained in this way contain 65% by volume of silicon nitride powder. The iron content is on average 0.009% by weight. No iron particles produced by erosion can be detected in the granules by microscopy.

I claim:

1. A process for the preparation of a thermoplastic material containing ceramic powders as fillers, by mixing these ceramic powders with molten thermoplastic in a mixing zone having a plurality of successive zones which process comprises: melting the thermoplastic in a first zone, adding a suspension of the ceramic powder in an organic solvent to the molten thermoplastic in a second zone and mixing the components, removing the solvent under reduced pressure in a third zone, and compressing and extruding the melt containing the ceramic powder in a fourth zone.

2. The process as defined in claim 1, wherein the suspension of a ceramic powder in an organic solvent has been subjected to deagglomeration by the action of shear forces.

3. The process as defined in claim 1, wherein the ceramic powder is an oxide, nitride, silicide or mixtures thereof of a third or fourth main or sub-group element.

4. The process as defined in claim 1, wherein the suspension contains from 10 to 35% by volume of ceramic powders.

5. The process as defined in claim 1, wherein the suspension also contains fibers having a length of from 0.01 to 1 mm.

* * * * *